UNITED STATES PATENT OFFICE.

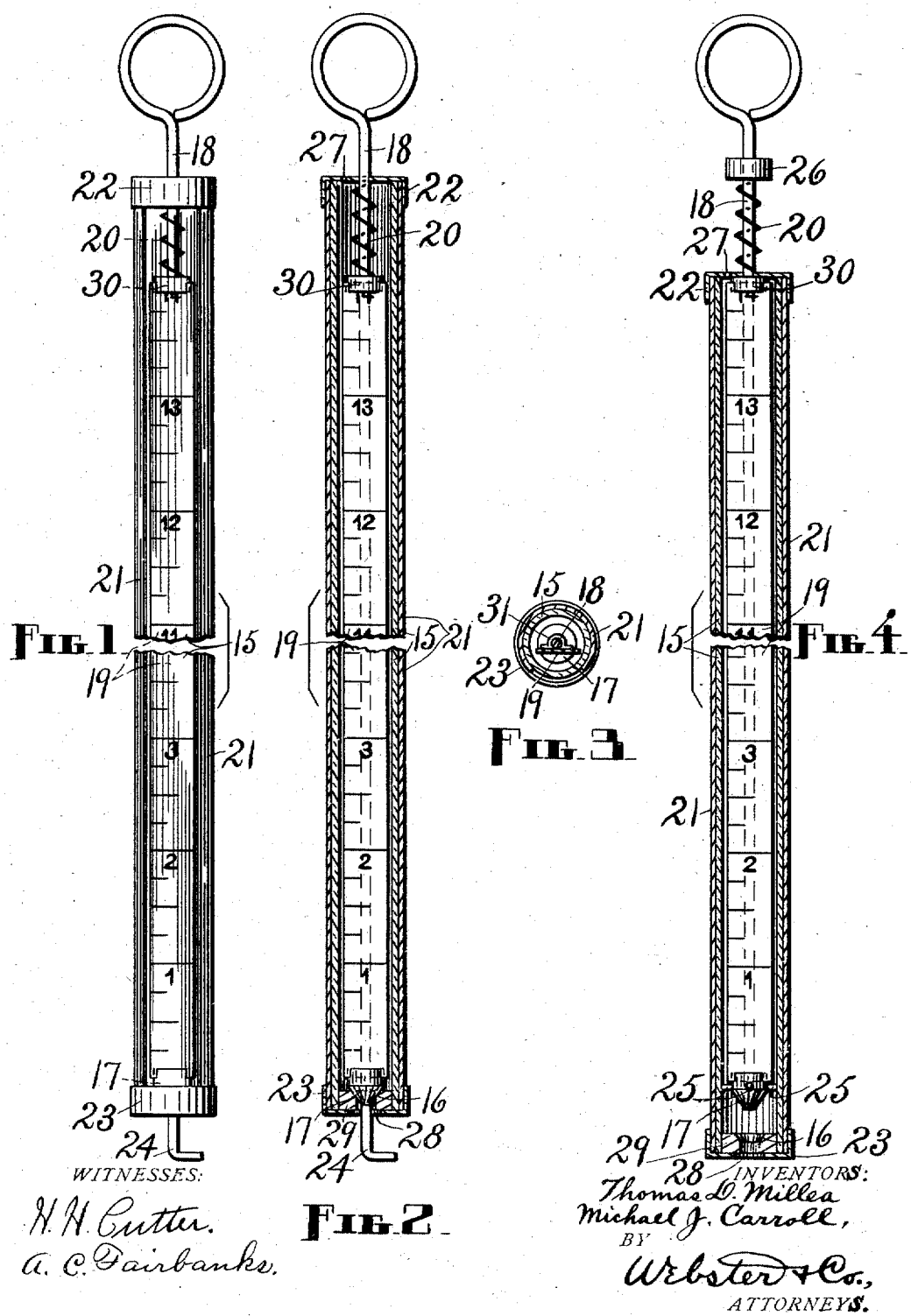

THOMAS D. MILLEA AND MICHAEL J. CARROLL, OF SPRINGFIELD, MASSACHUSETTS.

LIQUID-GAGE.

980,320. Specification of Letters Patent. Patented Jan. 3, 1911.

Application filed March 22, 1909. Serial No. 484,970.

*To all whom it may concern:*

Be it known that we, THOMAS D. MILLEA and MICHAEL J. CARROLL, both citizens of the United States of America, and residents of Springfield, in the county of Hampden and State of Massachusetts, have invented a new and useful Liquid-Gage, of which the following is a specification.

Our invention relates to improvements in devices designed particularly for ascertaining the amount of the liquid contents of a tank or other vessel or container by measuring the depth or height of such contents, and consists essentially of a transparent tube having a scale therein and provided with a spring-controlled valve, all as hereinafter set forth.

Heretofore much difficulty has been experienced in ascertaining with any degree of accuracy the amount of gasolene in an automobile tank, various ineffectual make-shifts for this purpose having been commonly employed, and the primary object of our invention is to produce an accurate measure or gage, which is simple, durable and inexpensive, for easily and quickly determining at any time what quantity of gasolene is on hand or what amount has been introduced into the tank, frequent tests of this kind being necessary, as is well-known.

A further object of our invention is to provide a gage which can also be utilized as a primer when occasion requires.

Although especially adapted for use in connection with automobiles, our device is equally useful for measuring the contents of barrels, cans, and other vessels which have no relation to automobiles, whether the same contain gasolene or other liquids.
We attain these objects by the means illustrated in the accompanying drawings, in which—

Figure 1 is a front elevation of a practical form of our invention; Fig. 2, a central vertical section through the gage shown in the preceding view; Fig. 3, a cross-section of the same, and, Fig. 4, a central vertical section through a slightly modified form of gage.

The middle portion of the gage is broken out in each of the first two and the last view.

Similar figures refer to similar parts throughout the several views.
Referring to the drawings, it will be observed that we provide a transparent tube 15 with a valve-seat 16 in the bottom end, and place within such tube a valve 17 for such seat, and that this valve has a long stem 18 to which is fastened a scale 19. There is also employed a spring 20 arranged to act on the valve 17. These are the essential parts, but a shield 21 may be used to stiffen and protect the tube 15, together with caps 22 and 23 at the top and bottom, respectively, of the device; and for a gage with a normally closed valve, as shown in Figs. 1 and 2, the stem 18 is continued downward through the valve-seat 16 to form a footpiece 24, while for a gage with a normally open valve, as shown in Fig. 4, the valve 17 is provided with radial centering arms 25, and the stem 18 with a collar 26 on the upper terminal, above the cap 22, for the spring 20.

We prefer to employ celluloid for the tube 15 rather than glass, because the latter is very likely to get broken. The celluloid tube is prevented from warping out of shape, as it might do, owing to its length, by the shield 21. The caps 22 and 23 are secured to the shield 21 over the ends of the tube 15 and said shield, and so complete the casing of the device. There is a venthole 27 in the top of the cap 22, for obvious reasons, and an opening 28 in the bottom of the cap 23 of such size as to leave unobstructed the entrance from below to the valve-seat opening. The valve-seat 16 is in a plug 29 fitted into the bottom end of the tube 15. The shield 21 is open in front so as to afford a good view of the scale 19 within the tube. In the present case the scale 19 has its base let into the top of the valve 17 and its upper end let into a collar 30, both the valve and collar being tight on the stem 18, and wires or straps are arranged at intervals between said collar and said valve to fasten said scale to said stem and still further assist in retaining the scale in position, one such strap being shown at 31 in Fig. 3. The straps 31 are attached to the back side of the scale 19 and embrace the stem 18. These details are, of course, of no great importance so far as the actual invention is concerned.

By shellacking the scale we render it impervious to gasolene, and the celluloid tube is also impervious to gasolene. For some kinds of liquids different treatment of the scale would be necessary or it might be made of glass, and glass or some material other than celluloid would have to be used for the tube.

The face of the scale is graduated in any suitable manner, that is to say, it has marked thereon whatever lines and figures are suited to the requirements of the gage.

The valve-stem 18 extends upward through the cap 22 and terminates at the top in a ring.

In Figs. 1 and 2, the spring 20 encircles the valve-stem 18 between the collar 30 and the cap 22 and so tensions said stem downward and presses the valve 17 onto its seat 16; and in Fig. 4, the spring 20 encircles the valve-stem 18 between the cap 22 and the collar 26 and so tensions said stem upward with the valve 17 off of its seat 16. In the first instance the valve is self-closing and normally closed, while in the second instance the valve is self-opening and normally open, but in spite of these differences in what may be called the normal or automatic working of the valves there is no material difference in construction between the two gages. The vertical part of the foot-piece 24, although necessarily smaller than the opening through the plug 29, serves to guide the valve 17 to its seat, and the arms 25 perform the same function in the other construction, since they are guided by the walls of the tube. Any other of the old and well-known guides employed for centering valves or directing them to their seats may be substituted for the arms 25, or in some cases such means may be omitted altogether.

In using the gage with the normally closed valve for measuring purposes, it is first inserted vertically into the tank containing the liquid to be measured and pressed down to open the valve 17 against the force of the spring 20, through the medium of the foot-piece 24, and then said gage is withdrawn from said tank, said spring immediately acting to close said valve. While in the tank, with the valve 17 open, the liquid in said tank enters the tube 15 through the valve-seat 16 and rises therein until it stands on a level with the liquid outside of the tube, and with the gage out of the tank the height of this level can be readily determined by looking through the tube at the scale 19 and noting the point thereon at which the liquid in the tube stops. Knowing how to calculate the cubic contents of the tank or the number of gallons which it will contain by the scale, it is now a simple matter with the gage in hand to figure out the amount of liquid in the tank. After this has been done, the tube is emptied by drawing up the valve-stem at the top to open the valve to allow the liquid in said tube to escape through the opening in the plug 29 back into the tank. Then the valve-stem is released and the gage is ready for the next test.

The operation of the gage with the normally open valve is very similar to that of the one just described, excepting that with this gage it is necessary to press the valve-stem downward against the force of the spring in order to close the valve before taking the gage from the tank, and thus to hold the valve closed until the reading has been taken, after which the valve-stem is released and the valve permitted to open for the discharge of the contents of the tube into the tank.

When either of the gages is used for priming purposes, it is dipped into the gasolene and a little of the latter is taken into the tube, then with the valve closed the gage is withdrawn and transferred to the priming point where said valve is opened or permitted to open to allow the gasolene in the tube to run out.

It is quite obvious that this device is susceptible to a number of changes, some of which have already been pointed out in detail herein, that do not take it out of the range of our present invention.

What we claim as our invention, and desire to secure by Letters Patent, is—

A liquid gage comprising a transparent tube closed at the top and provided with a valve-seat, a valve-stem and a valve for such seat, such stem having a projecting part below the top of the tube and extending both above and below said tube, a spring between said projecting part of said stem and said top of the tube arranged to retain said valve normally on its seat, and a suitable scale adapted to show the height of liquid confined within the tube when said valve is closed.

THOMAS D. MILLEA.
MICHAEL J. CARROLL.

Witnesses:
F. A. CUTTER,
A. C. FAIRBANKS.